Nov. 8, 1949 C. E. HEMMINGER 2,487,132
CONTACTING GASEOUS FLUID WITH SOLID PARTICLES
Filed Dec. 9, 1944 3 Sheets-Sheet 2

Charles E. Hemminger Inventor
By _____ Attorney

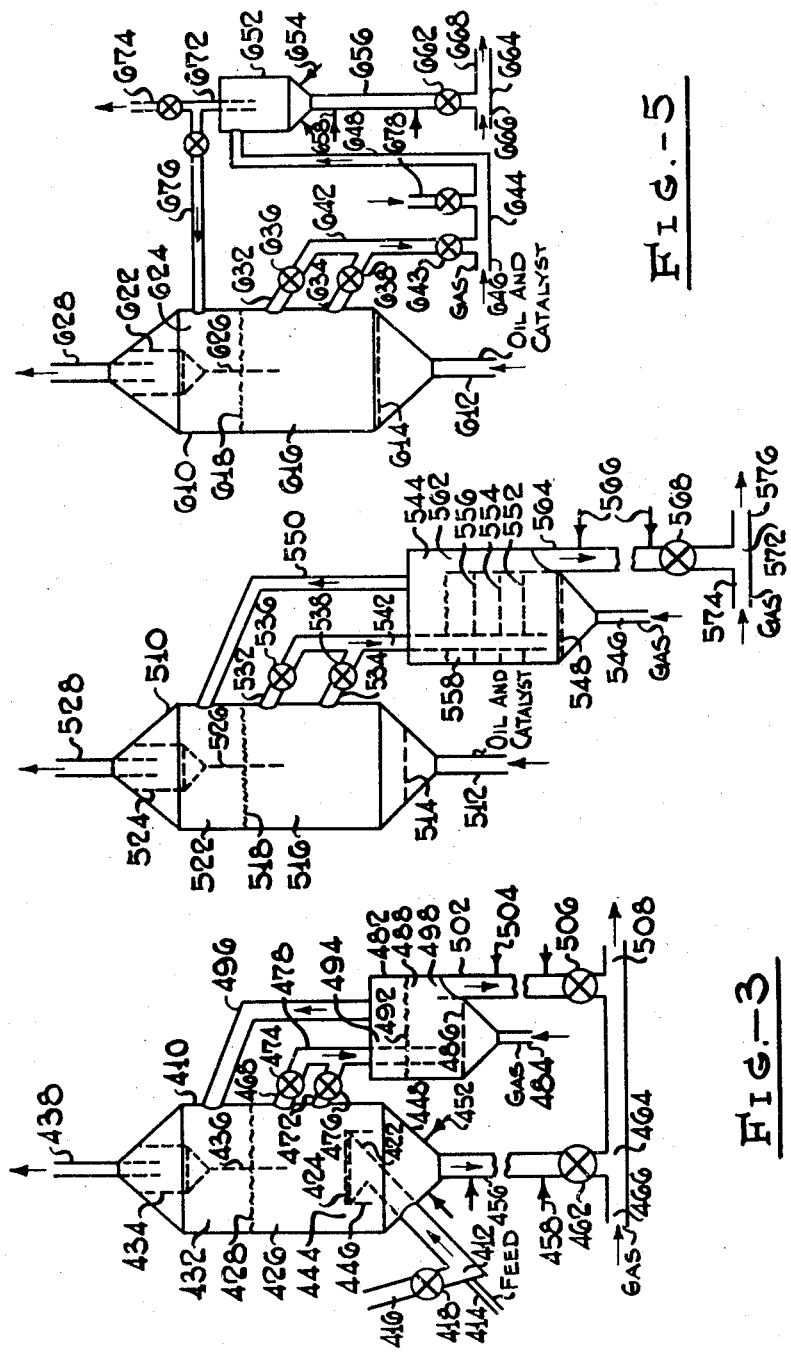

Patented Nov. 8, 1949

2,487,132

UNITED STATES PATENT OFFICE 2,487,132

CONTACTING GASEOUS FLUID WITH SOLID PARTICLES

Charles E. Hemminger, Westfield, N. J., assignor to Standard Oil Development Company, a corporation of Delaware Application December 9, 1944, Serial No. 567,423

5 Claims. (Cl. 196—52)

This invention relates to contacting gaseous fluids with solid particles, and more particularly, relates to stripping or purging fouled or spent catalyst or contact particles.

In catalytic reactions where organic compounds are reacted, the catalyst or contact particles become spent or fouled by the deposition of carbonaceous material. In the conversion of hydrocarbons, coke or hydrogen-containing carbonaceous material is deposited on the solid particles and the deposited material is usually removed by a regeneration step as by burning with air or other oxygen-containing gas. In this invention the contact or catalyst particles are in divided form which are removed from the reaction zone and passed to a regeneration zone for regeneration.

The catalyst or contact particles removed from the reaction zone contain volatile material which it is desired to remove by stripping or purging in order to recover volatile material and to reduce the load on the regeneration zone.

In the bottom draw-off units now in use the amount of stripping of the spent catalyst is limited because the spent catalyst is withdrawn from the bottom of the reaction zone, is stripped and then passed to the regeneration zone. In certain cases insufficient stripping of the spent catalyst has been obtained.

According to one form of my invention, stripping or improved stripping is obtained by using a separate stripping vessel. With the fluid catalyst plants now in operation in which the catalyst is withdrawn in a dense phase from the bottom of the reaction zone, a separate stripping vessel of any size may be constructed and used in connection with the reaction zone in such units. Such stripping vessels may be used without increasing the height of the fluid catalyst structure or changing the location of the reactor and as long a time of contact of stripping as desired may be employed. It is beneficial to have a relatively long time of contact for removing a large part of the entrained vapors in the spent catalyst.

Good distribution of the stripping gas may be obtained by using the separate stripping vessels and better distribution is obtained by employing grids, baffles, perforated partitions and other devices to insure good mixing of the spent catalyst and stripping gas in the stripping vessel.

In the bottom draw-off units the stripping gas together with the vapors stripped out of the catalyst is passed upwardly into the reaction zone. As the velocity of the vapors and gases passing upwardly through the reaction zone is limited, it will be seen that the passage of stripping gas and vapors from the stripping zone cuts down on the amount of charging oil vapors passing upwardly through the reaction zone. In cases where the reaction vessel is large enough to take care of the additional stripping gas and vapors it means that the reaction vessel is too large and by using a separate stripping vessel a smaller diameter reactor may be employed.

With the separate stripping vessel the point of catalyst withdrawn from the reaction vessel may be selected at any height of the reaction vessel. Also higher temperatures may be employed in the stripping vessel by introducing hot regenerated catalyst. Higher temperatures aid in the stripping of catalyst. Superheated steam or steam superheated to a higher degree than previously used also assists in producing better stripping. Small quantities of air or other oxygen containing gas may be used without greatly affecting the quality of the cracked products from the reaction vessel. The air causes combustion of the carbonaceous material and in this way raises the temperature of the catalyst particles during stripping.

The effluent gases from the separate stripping vessel may be handled either by returning them to the top of the reaction vessel above the dense phase of catalyst or they may be separately processed. One method is to partially condense the oil so that the catalyst is retained in the oil before total condensation of the steam. The oil and catalyst may then be sent to the fractionator and with such an operation the load on the fractionator is appreciably relieved.

Where relatively low temperatures are used in the reaction zone during the catalytic reaction and the catalytic or contact particles are then stripped, the stripping or purging is incomplete because of the low temperature. Stripping or purging is accomplished by passing a stripping gas through the spent or fouled catalyst or contact particles. In the catalytic conversion of hydrocarbons, stripping can be improved by increasing the temperature of the catalyst or contact particles in the stripping zone or during the stripping step.

According to the preferred form of my invention, the stripping or purging step is carried out in a separate reaction zone or treating zone at a relatively high temperature. With improved stripping the temperature in the main reaction zone may be decreased and this results in a decrease of gas losses during the cracking or conversion step so that the overall operation will give less gas and less coke or carbonaceous material than a single reactor system. This is of special importance in high coke operations such as the conversion of reduced crude oils or various types of cycle stock. The lower temperature of the cracking or conversion step also improves the quality of many of the products, such as the heating oil, and also gives a greater sulfur reduction in the products.

My invention is adapted for use with upflow units, that is, where gases and/or vapors and all catalyst passes overhead from the treating zones, but it is especially adapted for use with the improved types of catalytic cracking units where the catalyst or contact particles are maintained in a dense fluidized condition in the reaction zone and regeneration zone and the catalyst is withdrawn directly from these zones as a dense fluidized mixture. Several forms of my invention are set forth for obtaining improved stripping.

In the drawings;

Fig. 3 represents a vertical longitudinal cross-section of a portion of the apparatus shown in Fig. 1 of the drawing and shows a slightly different form of stripping vessel;

Fig. 4 represents a vertical longitudinal cross-section of another form of reactor in which the oil and catalyst are introduced into the bottom of the reaction vessel and fouled catalyst is withdrawn from the side of the reaction vessel and passed to a separate stripping vessel; and Fig. 5 represents a vertical longitudinal cross-section of another form of my invention in which the fouled catalyst is withdrawn from the sides of the reaction vessel, then mixed with a stripping gas and passed to a cyclone separator or other separating means for separating the stripped catalyst from the stripping gas and vapors stripped out of the catalyst.

Figure 1:
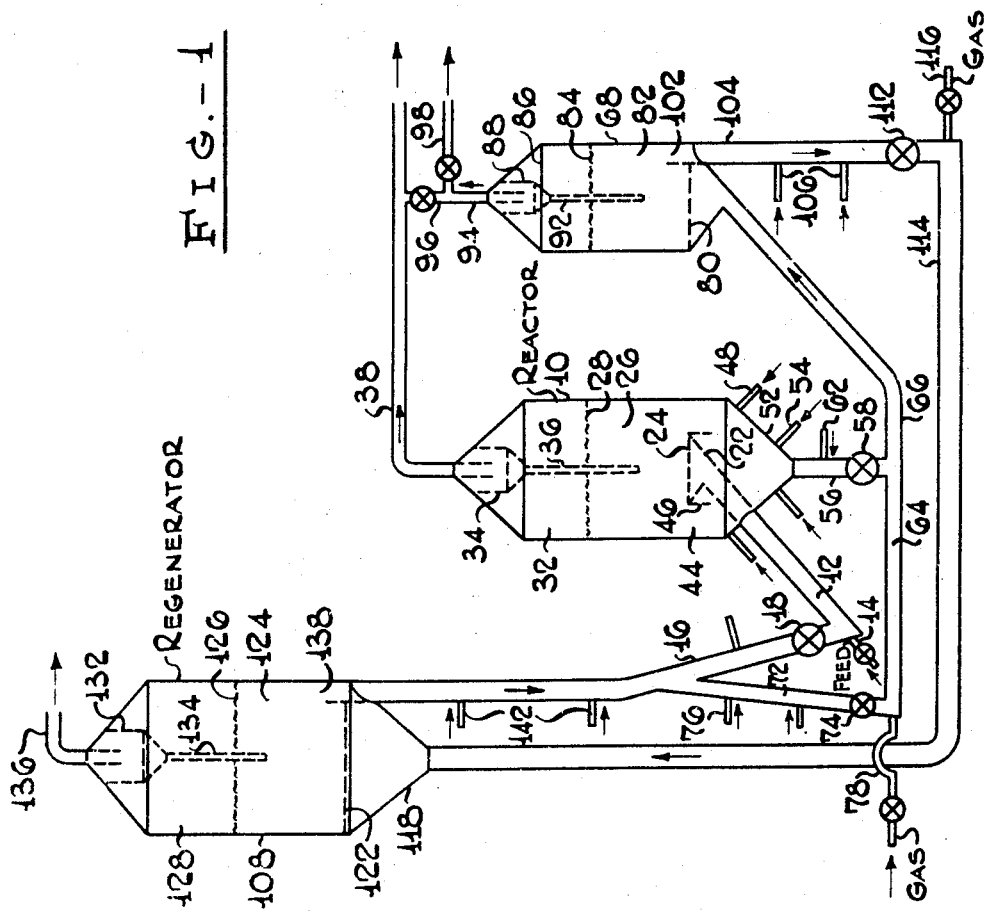
Fig. 1 represents one form of apparatus which may be used in carrying out my invention.

Referring now to Fig. 1, the reference character 10 designates a cylindrical vessel comprising a reaction zone. The vessel 10 is provided with an inlet line 12 into which the reactants are introduced through line 14. The reactants are mixed with hot regenerated catalyst particles from standpipe 16 provided with a control valve 18 at the lower portion thereof to control the rate of flow of catalyst particles from the standpipe 16 into the inlet line 12.

In the catalytic conversion of hydrocarbons, the feed may comprise a heated liquid or vapor hydrocarbon stock, such as crude oil, reduced crude oil, gas oil, naphtha, etc. Where the reactants are below reaction temperature, a sufficient amount of catalyst or solid particles is used to supply the heat to vaporize the feed stock and also to raise it to reaction temperature.

The suspension of solid particles in feed vapors or the mixture of the feed or catalyst particles is passed through the inlet line 12 into a conical feed inlet 22 arranged in the lower portion of the reaction vessel 10 and provided with a perforated plate member or grid 24 in its upper portion. The grid member 24 is arranged in a horizontal position. The velocity of the vapors or gases passing upwardly through the reaction vessel 10 is selected to maintain the solid particles in a dry fluidized dense liquid-simulating condition or mixture 26 having a level indicated at 28. The mixture 26 is in a turbulent condition and violently agitated to obtain extremely good contact between the gases or vapors and the solid particles. The level 28 is similar to the surface of a boiling liquid.

Above the dense bed or mixture 26 is a dilute phase 32 in which the vaporous reaction products contain only a small amount of entrained solid particles. The hot vaporous reaction products are passed through separating means 34 preferably arranged in the upper part of the reaction vessel 10 to separate entrained solid particles from the vaporous reaction products in a dry separation step. The separated solid particles are returned to the dense bed or mixture 26 through dip pipe 36 which extends below level 28 of the fluidized mixture in the reaction vessel. The hot vaporous reaction products pass overhead through line 38 and are passed to any suitable equipment for separating the desired products.

In the catalytic cracking of hydrocarbons the cracked vaporous products are passed to a fractionating system to separate gasoline from gases and hydrocarbon fractions boiling above the gasoline boiling range. The separating means 34 is shown in the drawing as a cyclone separator but other forms of separating means may be used, and if desired, more than one separating step may be used in series to recover an additional amount of entrained solid particles from the vaporous reaction products. Entrained catalyst particles in the vaporous reaction products may be recovered by a scrubbing step or where a fractionating system is used, they are recovered in the condensate oil withdrawn from the bottom of the fractionating tower.

For the catalytic conversion or cracking of hydrocarbons, any suitable conversion or cracking catalyst may be used, such as acid-treated bentonite clays, synthetic silica alumina or synthetic silica magnesia gels, etc. Preferably the catalyst is in divided form having a particle size between about 100 standard mesh and 400 standard mesh. Preferably about 95% of the particles pass through 100 standard mesh and the catalyst mixture contains up to 10% of 0 to 20 micron material. However, larger catalyst sizes may be used if desired.

Using the finely divided catalyst or powdered catalyst of the type above described and with a velocity of the vapors or gases passing through the reaction zone 10 at between about 0.5 ft./second and 1.5 ft./second, the density of the fluidized dense bed 26 may vary between about 20 lbs./cu. ft. and 35 lbs./cu. ft. In the dilute phase 32 the density varies between about 1 lb./cu. ft. and 5 lbs./cu. ft.

In the catalytic conversion of hydrocarbons, temperatures between about 750° F. and 990° F. may be used. Preferably, when cracking gas oil, the temperature is between about 800° F. and 950° F. The amount of catalyst used may vary between about 5 parts of catalyst to 1 of oil to 30 parts of catalyst to 1 of oil by weight.

During the catalytic conversion the catalyst or contact particles become contaminated by the deposition of carbonaceous material. The spent or fouled catalyst particles are continuously withdrawn from the lower portion of the dense bed or mixture 26 and passed through an annular zone 44 positioned between the inner lower wall of the reaction vessel 10 and skirt 46 depending from the inlet grid member 24. The annular zone 44 may act as a preliminary stripping zone and stripping or fluidizing gas is preferably introduced through lines 48 into the upper part of the conical bottom 52 of the cylindrical reaction vessel 10.

Fluidizing gas, such as steam or other inert gases, such as flue gases, nitrogen and carbon dioxide, is introduced into the lower portion of the conical bottom 52 through one or more fluidizing lines 54 to maintain the partially stripped solid particles in a fluidized liquid-like condition. Sufficient gas may be introduced through lines 54 to also act as stripping gas in stripping section 44. The fluidized liquid-like mixture in dense condition is introduced into standpipe 56 provided with a control valve 58 at its lower end to control the rate of withdrawal of the spent or fouled catalyst particles from the standpipe. Preferably one or more fluidizing lines 62 are used for maintaining the catalyst or contact particles in a fluidized condition while they are in the standpipe 56 so that they act like a liquid and produce hydrostatic pressure at the base of the standpipe 56.

In a low temperature conversion operation, such as 850° F., incomplete stripping is obtained and it is better practice to raise the temperature of the fouled or spent catalyst before regenerating it. According to my invention, hot regenerated catalyst particles at a temperature of about 1075° F. are passed through line 64 and mixed with the spent or fouled catalyst particles introduced into line 66 from the standpipe 56 and this mixture is passed to a second reaction zone or vessel 68. The hot regenerated catalyst is introduced into line 64 from branch standpipe 72 having a control valve 74 at its lower portion for controlling the rate of feed of the hot regenerated catalyst particles from the standpipe 72 to the line 64. Preferably fluidizing lines 76 are provided for the standpipe 72. The standpipe 72 branches from the standpipe 16 hereinbefore described.

Stripping gas, such as steam, flue gasses, nitrogen, carbon dioxide, etc., is introduced into line 64 below the valve 74 through line 78 to form a relatively light suspension of solid particles in the gas and the preliminary mixture or suspension comprises hot regenerated catalyst and stripping gas. As this mixture moves along through pipe 64 it meets the spent or fouled catalyst particles introduced into the suspension from standpipe 56 and this mixtures is then passed through line 66 to the second reaction vessel 68 above described.

In passing upwardly through the feed line 66 to the second reaction zone 68, the suspension is passed upwardly through a perforated plate or distribution grid 80 for distributing the particles and stripping gas evenly across the area of the second reaction zone 68.

The hot regenerated catalyst is used in a sufficient amount to raise the temperature of the fouled or spent catalyst particles to about 950° F. The temperature of the regenerated catalyst particles before mixing is about 950° F. to 1100° F.

The velocity of the stripping gas passing upwardly through the second reaction zone or vessel or contacting zone 68 is so selected to maintain the particles undergoing stripping in a dense fluidized dry liquid-like condition or mixture 82 having a level at 84. The dense mixture 82 has about the same density as the dense mixture 26 in the reaction vessel 10. The velocity of the stripping gas passing upwardly through the zone or vessel 68 may vary between about 0.5 ft./second to 1.5 ft./second.

Above the dense bed or mixture 82 is a dilute phase or suspension 86 comprising gas having some entrained catalyst or contact particles. To remove the solid particles from the stripping gas and stripped out volatile material the gas is passed through a separating means 88 preferably arranged in the upper part of vessel 68 and the separated particles are returned to the dense bed or mixture 82 through dip pipe or leg 92 which extends below the level 84 in the second reaction zone 68.

The stripping gas and stripped out volatile material pass overhead through line 94 and may either be combined with the vaporous reaction products passing from the first reaction vessel 10 through line 38 by being passed through line 96. Or the stripping gas and stripped out volatile material may be separately removed through valved line 98 to separately recover volatile material or hydrocarbons stripped from the catalyst particles.

During stripping the temperature in the second reaction zone or stripping zone 68 is about 900° F. to 1000° F. The spent or fouled catalyst particles are not maintained in the second reaction zone for any extended period of time because the main action is a stripping or purging action. Some of the reactants are retained or adsorbed on the catalyst particles and some of the vapors are entrained in the spaces between the catalyst particles. The catalyst particles are maintained long enough in the second reaction zone or stripping zone 68 to remove entrained vapors and to crack the retained heavy constituents, such as heavy hydrocarbons, to convert them to coke or carbonaceous material and lighter volatile material.

The stripped or purged catalyst particles are withdrawn from the lower portion of the dense bed or mixture 82 through withdrawal pipe 102 which extends above grid member 80 and which forms the upper end of a standpipe 104. The standpipe is provided with fluidizing lines 106 for introducing fluidizing gas into the purged or stripped catalyst particles to maintain them in a fluidized liquid-like condition so that they produce a hydrostatic pressure at the base of the standpipe 104.

The hydrostatic pressure is used to move the catalyst particles to a regeneration zone 108 which is preferably arranged at a higher level than the reaction zone 10 or the second reaction zone or vessel 68. The standpipe 104 is provided at its lower end with a control valve 112 for controlling the rate of withdrawal of stripped or purged catalyst particles from the standpipe.

A regenerating gas, such as air or other oxygen-containing gas, is introduced into line 114 through line 116 where it is mixed with the purged or stripped catalyst particles and this mixture is then passed through line 114 into the conical bottom 118 of the cylindrical regeneration zone or vessel 108. The regeneration vessel 108 is provided in its lower portion with a horizontally arranged perforated distribution plate or grid member 122 for uniformly distributing the solid particles and the regenerating gas across the area of the regeneration vessel 108.

The velocity of the regenerating gas passing upwardly through the regeneration vessel 108 is selected to be between about 0.5 ft./second to 1.7 ft./second to form a dense dry fluidized liquid-like bed or mixture 124 in the regeneration vessel having a level 126. The mixture 124 is in a turbulent condition and violently agitated to obtain intimate mixing between the regenerating gas and the particles to be regenerated.

Above the dense bed or mixture 124 is a dilute phase or suspension 128 which comprises hot regeneration gases containing some entrained solid particles. The density of the dense bed or mixture 124 varies between about 15 lbs./cu. ft. to 35 lbs./cu. ft. and the density of the dilute phase 128 varies between about 1 lb./cu. ft. to 5 lbs./cu. ft.

The hot regenerated gases containing entrained catalyst particles are passed through separating means 132 for recovering some of the entrained catalyst particles from the hot regeneration gases. The separated catalyst particles are returned to the dense bed 124 through dip pipe or leg 134 which extends below the level 126 of the dense bed or mixture 124.

The hot regeneration gases following the separating step are passed through line 136 and as they still contain entrained solid particles, they may be passed through additional separating equipment similar to that shown at 132 in the drawing or they may be passed through electrostatic precipitators or scrubbing devices to recover substantially all of the entrained solid particles. As the regeneration gases are at an extremely high temperature, it is preferable to pass them through a heat recovery system, such as a waste heat boiler, before venting them to the atmosphere. Preferably the regeneration gases are cooled before being passed to an electrostatic precipitator if one is used.

Hot regenerated catalyst particles are removed in a dense fluidized condition from the lower portion of the dense bed or mixture 124 through withdrawal pipe 138 which extends above grid 122 and which forms the upper portion of the standpipe 16 hereinbefore described. Preferably the standpipe 16 is provided with a plurality of fluidizing lines 142 for introducing fluidizing or aerating gas into the catalyst particles in the standpipe to maintain them in a fluidized liquid-like condition so that they produce a hydrostatic pressure at the base of the standpipe 16. The hydrostatic pressure is used to move the catalyst particles to the reaction zone or vessel 10.

During regeneration the temperature is maintained between about 950° F. and 1100° F. It is important to prevent exceedingly high temperatures in the regeneration zone as high temperatures tend to deactivate most catalysts. As the regeneration operation with air is an exothermic reaction, it may be necessary to provide cooling means for the regeneration vessel 108. Such a cooling means may comprise a cooling coil submerged in the dense bed or mixture 124 for circulating a heat exchange medium through the coil. Or a portion of the hot regenerated catalyst may be withdrawn from the regeneration vessel 108, cooled and returned to the regeneration vessel 108.

In a catalytic cracking operation where gas oil is cracked at a temperature of about 800° F. to 950° F., the withdrawn spent or fouled catalyst from spent catalyst standpipe 56 is mixed with a sufficient amount of hot regenerated catalyst particles at a temperature of about 1000° F. to 1100° F. to increase the temperature of the spent or fouled catalyst about 25 to 150° above the temperature in the cracking zone 10.

The advantages of my invention are as follows. Ordinarily, when changing a unit from a gas oil cracking to a reduced crude cracking, the capacity of the main reaction zone 10 is reduced. With my invention the same amount of reduced crude oil is passed through the unit as when gas oil is used due to the fact that less gas and less coke or carbonaceous material is obtained with the lower temperature used in the cracking operation. Also because of the lower temperature in the main reaction zone 10 the overall gas loss will be about 5 weight per cent rather than 11 weight per cent when cracking reduced crude oil at 50% conversion. In addition, the heating oil separated as a desired fraction from the reaction products will have about 3 to 4° higher A. P. I. gravity. Because of the lower temperature, the coke or carbonaceous yield during gas oil cracking will be in the order of about 4% by weight on the feed rather than 7% by weight on the feed when cracking at 975° F. and 65% conversion. When operating on a reduced crude oil according to my invention, the coke or carbonaceous deposit will be 4 to 5% by weight on the feed rather than 6 to 7% by weight on the feed when cracking to 55% conversion.

In Fig. 1 instead of using the reactor design shown with the conical inlet member 22, a design similar to the regenerator 108 may be used with a grid similar to grid 122 and a withdrawal tube similar to the tube 138 in which some stripping may be carried out.

Figure 2:
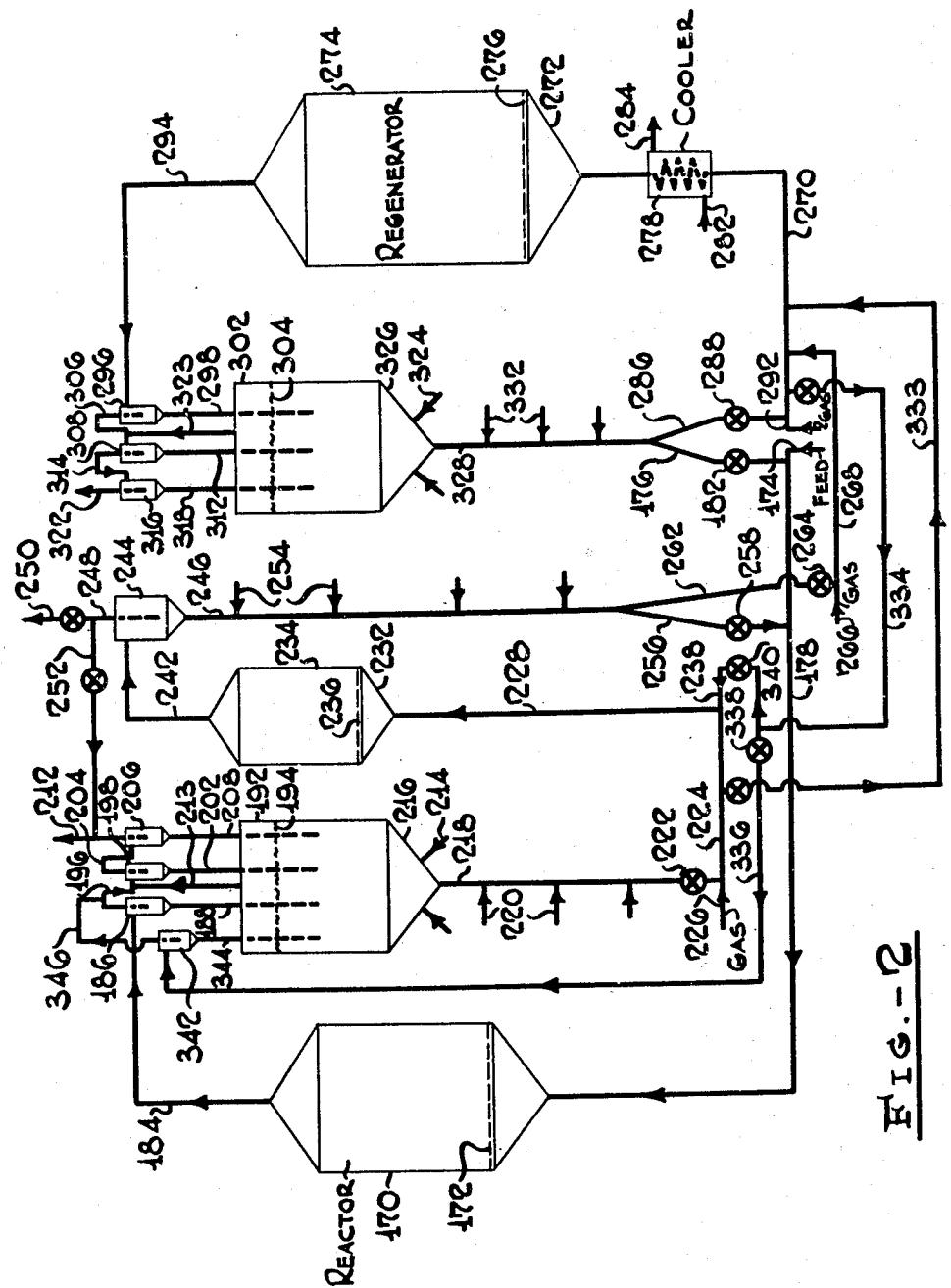
Fig. 2 represents another form of apparatus in which all of the catalyst and vapors or gases pass overhead from the respective reaction zones.

Referring now to Fig. 2, the reference character 170 designates a cylindrical reaction vessel provided with a distribution plate or grid member 172 in its bottom portion. Line 174 is provided for the introduction of oil vapors which are mixed with hot regenerated catalyst from branch standpipe 176 and the mixture passed through line 178 to the bottom portion of the reaction zone or vessel 170 below the distribution plate 172. Standpipe 176 is provided with a control valve 182 for regulating the amount of catalyst particles introduced into line 178.

The mixture of catalyst or contact particles and hydrocarbon vapors is maintained as a dense turbulent mass in the reaction zone or vessel 170 by proper selection of the velocity of the vapors passing upwardly through the vessel 170. For powdered material as above described the velocity of the vapors is between about 2.0 ft./second and 5 ft./second and the density of the mixture is about 10 lbs./cu. ft. to 25 lbs./cu. ft. During the cracking or conversion of the hydrocarbon vapors, coke or carbonaceous material is deposited on the catalyst or contact particles. The spent or fouled catalyst particles together with vaporous reaction products pass overhead through line 184 to a primary cyclone separator 186 for separating the bulk of the catalyst or contact particles from the vaporous reaction products.

The separated solid particles are withdrawn from the bottom of the separator 186 through line 188 which feeds into a hopper 192 below the level 194 of catalyst particles therein. The vaporous reaction products then pass through line 196 to a secondary cyclone separator 198 for separating an additional quantity of solid particles from the vaporous reaction products. The separated particles are returned by pipe 202 to the hopper 192 below the level 194 of catalyst particles therein.

The vaporous reaction products then pass through line 204 to a tertiary cyclone separator 206 for separating an additional quantity of solid particles from the vaporous reaction products. These solid particles are returned to the hopper 192 through line 208 which extends below the level 194 of the catalyst or contact particles in the hopper 192. The vaporous reaction products pass overhead from the tertiary cyclone separator 206 through line 212 and are preferably passed to a fractionating system for separating desired products.

Line 213 leads from the top of hopper 192 to inlet line 198 to the secondary separator 198 to remove any accumulated gas and/or stripped vapors from the hopper 192.

The solid particles in the hopper 192 are maintained in a fluidized condition by the introduction of fluidizing or aerating gas introduced through lines 214 into the bottom conical portion 216 of the hopper 192. The fluidized particles flow into standpipe 218 provided with fluidizing lines 220 for maintaining the solid particles in a fluidized liquid-like condition so that they exert a hydrostatic pressure at the base of the standpipe 218.

The standpipe 218 is provided with a control valve 222 in its bottom portion for controlling the rate of withdrawal of spent catalyst particles from the hopper 192. The spent catalyst particles are mixed with a regenerating gas, such as air or other oxygen-containing gas introduced into line 224 through line 226 for admixture with the spent or fouled catalyst particles.

The less dense mixture or suspension is passed upwardly through line 228 into the bottom conical portion 232 of a second reaction zone or stripping zone 234 provided with a distribution plate 236 in its lower portion.

My invention is especially adapted for operations in which the first reaction vessel 170 is maintained at relatively low temperatures and because of the low temperatures incomplete stripping is obtained. To improve the stripping, I introduce hot regenerated catalyst or contact particles into the lower end of the line 228 through line 238 so that the resulting mixture in the second reaction zone or vessel 234 is at a much higher temperature than the temperature in the first reaction zone 170.

For example, in the catalytic cracking of a light naphthenic feed stock, such as Mirando gas oil boiling between about 350° F. and 700° F., the temperature in the first reaction zone 170 is about 775° F. and the catalyst comprises synthetic silica alumina gel. The time of contact between the gas oil vapors and the catalyst particles is about 20 seconds.

The hot regenerated catalyst particles introduced through line 238 is about 950° F. to 1100° F. and a sufficient amount of the hot catalyst is used to raise the temperature in the second reaction zone 234 to about 900 to 950° F. If desired, additional gas, such as steam, may be introduced into line 228.

The velocity of the gases passing upwardly into the second reaction zone or stripping zone 234 is selected to maintain the particles in the zone in a dense fluidized liquid-simulating condition. The mixture is a dry one and is maintained in a turbulent or agitated condition to insure intimate contact between the particles and the stripping gas. Also, the turbulence and agitation assist in mixing the hot regenerated catalyst particles with the spent catalyst particles so that the temperature of the mixture is substantially uniform throughout. The velocity of the gases passing upwardly through the second reaction zone 234 may vary between about 2 ft./second to 5 ft./second.

The solid particles and the stripping gas pass overhead through line 242 to a separating means 244 which is shown in the drawing as a cyclone separator. More than one cyclone separator may be used in series or other separating means may be used. The separated catalyst or contact particles are withdrawn from the bottom of the separating means 244 and pass to a second standpipe 246 presently to be described in greater detail.

The stripping gas with volatile material stripped out of the spent catalyst particles passes overhead through line 248 and may be separately withdrawn through line 250 for separate recovery of the volatile material. Or the gaseous fluid leaving the top of the separating means 244 may be passed through valved line 252 and combined with the overhead vaporous reaction products passing through line 212 from the tertiary cyclone 206 above described.

Returning now to the standpipe 246, the stripped hot spent catalyst particles are maintained in a fluidized liquid-like condition in the standpipe 246 by the introduction of fluidizing gas through lines 254 so that the particles produce a hydrostatic pressure at the base of the standpipe.

In cases where the catalyst particles are only partially spent, they may be returned to the reaction zone 170 through line 178 from branch standpipe 255 which branches off standpipe 246. Branch standpipe 256 is provided with a control valve 258.

In most cases the catalyst particles are sufficiently spent or fouled to require regeneration and the stripped spent catalyst particles are passed through another branch standpipe 262 which also branches off the bottom portion of the standpipe 246. Branch standpipe 262 is provided with a control valve 264 for controlling the rate of withdrawal of catalyst particles from the standpipe 246.

A regenerating gas, such as air or other oxygen-containing gas, is introduced through line 266 and mixed with the stripped spent catalyst and the mixture passed through lines 268 and 270 into the bottom conical portion 272 of a regeneration zone or vessel 274 provided at its bottom portion with a perforated distribution plate or grid member 276.

Before being introduced into the regeneration zone or vessel 274, the suspension of catalyst particles in the regenerating gas is passed through a heat exchange device 278 provided with an inlet 282 and an outlet 284 for the circulation of a heat exchange medium. If desired, fresh feed stock which is to be cracked or converted may be preheated by being used as a heat exchange medium.

The regeneration is an exothermic reaction due to the burning of coke or carbonaceous material deposited on the catalyst or contact particles. Because the reaction is exothermic, it is necessary to control the temperature in the regeneration zone or vessel 274 to prevent unduly high temperatures. One method of controlling the temperature is to recycle regenerated catalyst particles to the regeneration zone 274. Hot regenerated catalyst particles from branch standpipe 286 having a control valve 288 is mixed with a suspending gas, such as air or steam, introduced through line 292 and this mixture passed through line 270 for admixture with the stripped spent catalyst passing through line 270 and through heat exchanger 278 for introduction into the regeneration zone or vessel 274.

The catalyst or contact particles undergoing regeneration are maintained in a dense turbulent liquid-simulating condition and with the catalyst above mentioned, the density may vary between about 10 lbs./cu. ft. to 25 lbs./ cu. ft. when the velocity of the regenerating gas passing upwardly through the regeneration zone 274 varies between about 2 ft./second and 5 ft./second.

The hot regenerated catalyst or contact particles and hot regeneration gases pass overhead from the regeneration zone or vessel 274 through line 294 to a first cyclone separator 296 for separating the bulk of the hot regenerated catalyst from the regeneration gases. The separated regenerated particles are passed from the bottom of the separating means 296 through line 298 into regenerated catalyst hopper 302 below the level 304 of regenerated catalyst particles therein.

The regeneration gases pass overhead from the first cyclone separator 296 through line 306 to a secondary cyclone separator 308 for the separation of additional quantities of entrained particles. The separated particles are withdrawn from the bottom of the separating means through line 312 and introduced into the hopper 302 below the level 304 of particles therein.

The regeneration gases pass overhead from the secondary cyclone separator 308 through line 314 into a tertiary cyclone separator 316 for the separation of an additional quantity of entrained particles. The separated particles are withdrawn from the tertiary cyclone separator 316 through line 318 and passed to the hopper 302 below the level 304 of particles therein.

The hot regeneration gases pass overhead from the tertiary cyclone separator 316 through line 322. The hot regeneration gases still contain some entrained catalyst particle and the gases may be passed through an additional separating means, such as an electrostatic precipitator, bag filters, scrubbing devices, etc. As the regeneration gases are at a high temperature, it is preferred practice to pass the hot regeneration gases through a heat exchange device, such as a waste heat boiler, to recover heat therefrom.

Line 323 leads from the top of hopper 302 to inlet line 306 to secondary separator 308 to remove any accumulated gas from hopper 302.

The hot regenerated catalyst particles are maintained in a dense fluidized liquid-simulating condition in the hopper 302 by the introduction of fluidizing or aerating gas through lines 324 leading into the conical bottom 326 of the hopper 302. The fluidized particles flow into a third standpipe 328 provided with fluidizing lines 332 for maintaining the hot regenerated catalyst particles in a fluidized dry liquid-like condition in the standpipe so that a hydrostatic pressure is produced at the base of the standpipe. The pressure produced at the base of the respective standpipes is used to develop pressure lost by the pressure drop resulting from the passage of the suspension through the various pipes in the unit. The standpipe 328 is provided with the branch standpipes 176 and 286 hereinbefore described.

In passing through the second reaction zone or vessel or stripping zone 234, more complete stripping of the spent or fouled catalyst is provided. The solid particles to be stripped are not maintained in the second reaction zone 234 for any extended period of time. It is only necessary to remove vapors or volatile material from between the catalyst particles and to convert any heavy hydrocarbon deposit on the catalyst particles to gas or other hydrocarbon products.

My invention may be used in any process where improved stripping is desired and where there is a hotter catalyst stream available from the regeneration zone than the catalyst from the reaction zone.

Various units of the type generally above described but without the second reaction zone 234 have been installed and used heretofore. In order to improve the stripping of such units, the apparatus shown in Fig. 2 may be modified as follows: line 228, second reaction zone 234, line 242, separating means 244 and associated parts and standpipe 246 and lines 256, 262, 266 and 268 and associated parts may be omitted. Spent catalyst from line 224 is passed through line 333 to line 270 and regenerator 274. Part of the regenerated catalyst from branch standpipe 286 is passed through valved line 334 and then through line 336 with valve 338 therein open. Valve 340 in line 238 is closed. The rest of the hot regenerated catalyst from branch standpipe 286 is passed to line 270.

The hot regenerated catalyst particles from branch standpipe 286 together with a suspending gas, such as steam, is passed through the line 336 to a separating means 342 for separating the hot regenerated catalyst particles from the suspending gas. The separated hot regenerated catalyst particles are withdrawn from the bottom of the separating means 342 and passed through line 344 into the spent catalyst hopper 192 below the level 194 of particles therein. The suspending gas passes overhead through line 346 and preferably passes into the inlet line 196 for the secondary cyclone separator 198 for recovering any entrained catalyst particles.

The hot regenerated catalyst particles are introduced through line 344 in a sufficient amount to raise the temperature of the spent catalyst particles in the hopper 192 from about 775° F. to 900° F. to about 900° F. to 950° F. The catalyst particles in the hopper 192 are maintained in a fluidized and agitated condition so that the introduced hot particles are mixed and contacted with the cooler particles to raise the temperature of the cooler particles.

Referring now to Fig. 3 of the drawings, the reference character 410 designates a reaction vessel similar to that shown in Fig. 1 of the drawings. The reaction vessel is provided with a feed inlet 412 into which the reactants are introduced through line 414. The reactants are mixed with hot regenerated catalyst withdrawn from standpipe 416 provided with a control valve 418. The mixture of reactant vapors and catalyst particles is passed into conical inlet member 422 arranged in the lower portion of the reaction vessel 410. The conical inlet member 422 is provided with a horizontally arranged perforated grid member 424 for distributing the catalyst particles and vapors substantially uniformly across the area of the reaction vessel.

The velocity of the upflowing vapors is selected to maintain the catalyst particles in a dry, dense fluidized liquid-simulating condition or bed shown on 426 having a level indicated at 428. The particles are maintained in a turbulent condition to insure good contact or intimate contact between the vapors. Above the dense bed or mixture 426 is a dilute phase 432 which comprises vaporous reaction products containing some entrained catalyst particles.

The vaporous reaction products are passed through a separating means 434 for separating entrained catalyst from the vaporous reaction products.

The separated catalyst particles are returned to the dense bed or mixture 426 through return pipe or dip leg 436 which extends below the level 428. Vaporous reaction products pass overhead through line 438 and when hydrocarbons are being catalytically cracked, the reaction products are passed to a fractionating system for recovering desired products from gases and condensate oil.

While I have shown a cyclone separator as the separating means, it is to be understood that other forms of separating means may be used. Also more than one separating stage may be used to effect a better separation of solid particles from the entrained vapors.

Some of the fouled catalyst particles are withdrawn from the bottom portion of the dense bed or mixture 426 and passed through an annular stripping section 444 formed by the inner wall of the reaction vessel 410 and a skirt 446 which extends downwardly from the grid member 424. The stripped catalyst particles pass into the conical bottom portion 448 of the reaction vessel 410 where they are maintained in a fluidized condition by the introduction of a fluidizing gas introduced through one or more lines 452. Preferably a sufficient amount of gas is introduced through lines 452 to act as stripping gas in the stripping section 444. If desired, an additional amount of stripping gas may be introduced into the bottom portion of the stripping zone 444.

The stripped catalyst particles are flowed into standpipe 456 wherein the catalyst particles are maintained in a fluidized condition by the introduction of a fluidizing gas through one or more lnes 458. The fluidized catalyst particles produce a hydrostatic pressure at the bottom of the standpipe to build up pressure lost on the streams in passing through the equipment. The standpipe is provided with a control valve 462 at it lower portion. The stripped spent catalyst passes from the standpipe to line 464 where it is mixed with regenerating gas, such as air or other oxygen-containing gas, introduced through line 466 and the mixture is passed to a regeneration zone not shown in Fig. 3 but similar to that shown in Fig. 1. Before passing to the regeneration zone the spent catalyst is mixed with another portion of stripped spent catalyst as will now be described.

During the catalytic conversion of hydrocarbons, coke or carbonaceous material is deposited on the catalyst particles and it is necessary to regenerate them before using them over again in another conversion. Before regenerating the particles it is the preferred practice to strip the spent catalyst particles to remove entrained vapors. According to the form of my invention shown in Fig. 3, spent or fouled catalyst particles are withdrawn at one or more levels from the dense bed or mixture 426 from the side of the reaction vessel 410.

Draw-off lines 468 and 472 are shown at different levels communicating with the interior of the reaction vessel 410. More than two draw-off lines may be used in Figs. 3, 4 and 5. Draw-off line 468 is provided with a control valve 474 and draw-off line 472 is provided with a control valve 476. With these valves the amount of spent catalyst withdrawn at different levels may be controlled or the point of withdrawal of the spent catalyst may be selected so that all the catalyst may be withdrawn from the reaction vessel at one point or level or portions of the catalyst withdrawn at different points or levels. The draw-off lines 468 and 472 preferably slope downward. Fluidizing lines are preferably provided for lines 468 and 472 ahead of valves 474 and 476.

The draw-off lines 468 and 472 communicate with a vertically arranged pipe 478 which discharges the spent catalyst into a separate stripping vessel 482. Fluidizing gas is preferably introduced into line 478 to maintain the particles in fluidized condition. Vessel 482 is provided with a bottom inlet 484 for the introduction of a stripping gas such as steam. The stripping gas passes upwardly through a horizontally arranged perforated grid member 486. The velocity of the stripping gas is selected to maintain the spent catalyst particles in a dense fluidized condition or as a dense fluidized bed shown at 488 having a level indicated at 492.

The vertically arranged withdrawal line 478 extends below the level 492 in the stripping vessel 482 so that the spent catalyst particles are introduced into the spent catalyst mixture below the level thereof. The stripping gas maintains the catalyst particles in a turbulent condition so that intimate contact is maintained between the solid particles and the stripping gas.

Above the dense bed or mixture 488 is a dilute phase or mixture 494 which comprises stripping gas containing a small amount of entrained catalyst particles. The stripping gas and stripped out vapors leave the top of the stripping vessel 482 through a line 496 and the stripping gas and vapors are preferably introduced into the upper portion of the reaction vessel 410 into the dilute phase 432 therein. Any entrained catalyst particles are then removed in passing through the separating means 434 above described. Or the stream passing through line 496 may be withdrawn from the system and separately processed.

The stripped spent catalyst particles are withdrawn from the lower portion of the dense bed or mixture 488 through withdrawal pipe 498 which extends above the perforated grid member 486. Withdrawal pipe 498 forms the upper part of another standpipe 502 provided with lines 504 for introducing fluidizing or aerating gas into the standpipe for maintaining the particles in a dry fluidized liquid-like condition. The fluidized particles produce a hydrostatic pressure at the bottom of the standpipe 502.

The standpipe 502 is provided with a control valve 506 at its lower portion for controlling the rate of withdrawal of catalyst particles from the stripping vessel 482. The spent catalyst particles are passed from the standpipe 502 into the mixture of stripped spent catalyst particles and regenerating gas passing through line 464 above described. This mixture is then passed through line 508 to the regeneration zone not shown but above referred to.

The form of the invention shown in Fig. 3 may be used with bottom draw-off units now in use. Some of the spent catalyst particles are stripped in the stripping zone 444 as now used in the bottom draw-off units but the amount passing through the usual stripping zone may be controlled so that more of the spent catalyst particles are directed to the separate stripping vessel 482 in order to obtain improved stripping. By passing less catalyst through stripping zone 444, more time may be taken and better stripping obtained in the zone 444 than in cases where all the catalyst passes through zone 444.

With two or more side draw-off lines, the unit is rendered more flexible and this advantage is obtained with the forms of my invention shown in Figs. 3, 4 and 5. It is desirous to remove spent catalyst or contact particles from the upper portion of the bed below the level thereof to more nearly approach concurrent flow, that is, there is better removal of spent catalyst and oil vapors. The catalyst has a more uniform distribution of coke and in this way there is less deactivation of the catalyst during regeneration.

One of the withdrawal lines, such as the upper line 468, may be used when the level 428 is as shown in Fig. 3. If the level 428 falls, valve 474 in line 468 may be closed and valve 476 in line 472 opened to take catalyst off at a lower level. Or the draw-off lines may be used to test for the level 428 of the dense bed.

The same advantages of side withdrawal also apply to Figs. 4 and 5.

Referring now to Fig. 4, the reaction vessel 510 differs from the previous reaction vessels in that the spent or fouled catalyst particles are not withdrawn from the bottom of the reaction vessel from an annular stripping zone surrounding the conical inlet member. In this form of my invention the oil vapors or other feed and catalyst particles are passed through inlet line 512 below a perforated grid member 514 arranged in the lower portion of reaction vessel 510. With this form of my invention a smaller grid member may be used.

The velocity of the vapors passing upwardly through the reaction vessel 510 is selected to maintain the catalyst particles as a dense bed or mixture 516 comprising dense fluidized particles in a dry liquid-simulating condition. The mixture is maintained in a turbulent condition to insure intimate contact between the catalyst particles and the vapors or gases to be reacted. The dense fluidized mixture has a level indicated at 518.

Above the dense bed or mixture is a dilute phase 522 similar to that above described in the other forms of my invention. The vaporous reaction products containing entrained catalyst particles are passed through separating means 524 preferably arranged in the upper portion of the reaction vessel 510. The separated catalyst particles are returned to the dense bed or mixture 516 through dip leg 526. The vaporous products pass overhead through line 528.

Draw-off lines 532 and 534 are provided and these lines are similar to the draw-off lines above described in connection with Fig. 3. Draw-off line 532 communicates with the interior of the reaction vessel 510 and with the upper portion of the dense bed or mixture 516. Draw-off line 532 is provided with a control valve 536. Draw-off line 534 is arranged at a lower level and communicates with the interior of the reaction vessel 510 and with the lower portion of the dense bed or mixture 516. Draw-off line 534 is provided with a control valve 538.

The draw-off lines 532 and 534 communicate with a vertically arranged draw-off line 542 for introducing spent or fouled catalyst into the lower portion of a separate stripping vessel 544. The draw-off lines 532 and 534 and 542 are preferably provided with fluidizing lines.

The stripping vessel 544 is provided with a bottom inlet 546 for the introduction of a stripping gas such as steam. The steam or other stripping gas passes upwardly through horizontally arranged perforated grid member 548 in the lower portion of vessel 544. The lower end of the vertically arranged draw-off line 542 is arranged a short distance above the perforated grid member 548. The velocity of the stripping gas is selected to maintain the spent catalyst particles in a dry, fluidized condition during stripping. The stripping gas and vapors pass upwardly and leave the top of stripping vessel 544 through line 550 for introduction into the dilute phase 522 of reactor 510. Or the stripping gas and vapors may be withdrawn from the system.

As shown in the drawing, the stripping vessel 544 is provided with a plurality of spaced horizontal baffles or perforated plates 552, 554 and 556 which are arranged one above the other. More or less of the perforated plates may be used. In the preferred form of operation each perforated plate contains a dense bed of fluidized catalyst particles with a dilute phase thereabove and as the mixture passes upwardly through the baffles in the stripping vessel 544, the catalyst particles and stripping gas are further mixed.

The catalyst particles accumulate as a dry fluidized liquid-simulating bed or mixture on the top perforated plate 556 as shown at 558. The stripped catalyst particles overflow into a draw-off line 562 arranged within the stripping vessel 544 and extending above the top perforated grid 556 in the stripping vessel 544.

The withdrawal line or pipe 562 forms the upper portion of a standpipe 564 provided with fluidized lines 566 for introducing fluidized or aerating gas into the standpipe 564 to maintain the catalyst particles in a fluidized condition. The catalyst particles in the fluidized condition produce a hydrostatic pressure at the base of the standpipe 564.

The standpipe is provided with a control valve 568 at its lower portion for controlling the rate of withdrawal of catalyst particles from the stripping vessel 544. The stripped catalyst particles are introduced into line 572 into which a regenerating gas, such as air or other oxygen-containing gas, is introduced through line 574 and the less dense mixture is passed into line 576 to a regeneration zone.

To improve the stripping in the stripping vessel 482 described in connection with Fig. 3, it is possible to also introduce the plurality of perforated plates or baffles as shown in the stripping vessel of 544 in connection with Fig. 4. To further improve the stripping in the stripping vessels 482 and 544 it is within the contemplation of my invention to introduce hot regenerated catalyst into these stripping vessels to raise the temperature of the particles during stripping.

Referring now to Fig. 5 of the drawings, the reaction vessel 610 is similar to that shown in Fig. 4 in which the oil vapors and catalyst particles are introduced through a bottom inlet 612 below a perforated grid member 614 arranged in the bottom portion of the reaction vessel 610. A larger grid member 614 is shown in Fig. 5 than in Fig. 4 but if desired, a smaller grid member may be used.

The catalyst particles are maintained in a dense fluidized condition shown on 616 with a level indicated at 618. A separating means 622 is preferably arranged in the upper part of the reaction vessel 610 for separating entrained catalyst particles from the dilute phase 624, separate particles being returned by dip leg 626 to the dense mixture 616. The separated vapors pass overhead through line 626.

Draw-off line 632 communicates with an intermediate portion of the reaction vessel 610 below the level 618 of the fluidized mixture therein. A lower draw-off line 634 is provided which communicates with the dense bed or mixture 616 above the perforated grid 614. Draw-off lines 632 and 634 preferably slope downward and are preferably provided with lines for introducing fluidizing gas.

Draw-off line 632 is provided with a control valve 636 and draw-off line 634 is provided with a control valve 638. Draw-off lines 632 and 634 communicate with a vertically arranged draw-off line 642 provided at its lower end with a control valve 643. The spent or fouled catalyst particles are withdrawn from the reaction vessel 610 in a dense fluidized condition and in order to maintain the catalyst particles in a fluidized condition, fluidizing gas may be introduced into the vertically arranged draw-off line 642.

The withdrawn catalyst particles are then passed into line 644 where they are mixed with a stripping gas introduced through line 646 and this less dense mixture is passed upwardly through line 648 through a separating means 652 which is preferably arranged at about the same height as the upper portion of the reaction vessel 610. In the separating means 652 the catalyst particles are separated from the stripping gas and from the stripped out vapors and the stripped catalyst particles are collected in the bottom portion of the separating means 652. Preferably fluidized gas is introduced into the bottom portion of the separating means 652 through line 654 to maintain the catalyst particles in a dry fluidized liquid-like condition.

With this form of my invention there is dilution of the relatively dense catalyst mixture withdrawn through line 642 and better mixing and agitation and therefore better stripping. Stripping occurs in line 648 and in the hopper of the separating means 652. Short time stripping is obtained and this has the advantage of less cracking of higher boiling hydrocarbons associated with the spent catalyst particles. Also in passing from vessel 610 to separating means 652 there is a reduction in pressure on the catalyst suspension and this aids stripping.

The stripped catalyst particles are then introduced into a standpipe 656 provided with fluidizing lines 658 for maintaining the catalyst particles in a fluidized condition in the standpipe 656. The standpipe 656 is provided with a control valve 662 at its lower end for controlling the rate of withdrawal of catalyst particles from the standpipe 656.

From the standpipe 656 the stripped catalyst particles are passed to line 664 where they are intermixed with a regenerating gas introduced through line 666 and the less dense mixture is passed through line 668 to a regeneration zone for regenerating the catalyst particles before returning them to the reaction vessel 610.

The stripping gas and stripped out vapors leave the top of the separating means through line 672 and may be passed through lines 674 for separate processing or may be passed through valved line 676 into the upper portion of the reaction vessel 610.

To improve the stripping, hot regenerated catalyst may be introduced into line 644 through line 678. The spent catalyst particles in passing through lines 644 and 648 and while passing through the separating means 652 are stripped or purged to remove entrained vapors.

While I have shown side withdrawal lines for removing spent catalyst from the side of a reaction vessel below the level of the dense catalyst bed or mixture therein, I may also use similar side withdrawal lines for removing regenerated catalyst particles from the side of a regeneration vessel below the level of the dense catalyst bed or mixture therein. In such case the separate stripping zones may be dispensed with and the vertical withdrawal line communicating with the side draw-off lines is then used as a standpipe for returning the regenerated catalyst particles to the reaction zone or vessel. With such a regeneration vessel the regenerated catalyst particles withdrawn are more uniformly regenerated because of the concurrent flow of catalyst particles and regenerating gas in the regeneration zone or vessel.

The regeneration zones or vessels to be used with the reactors shown in Figs. 3, 4 and 5 may be of the same construction as the reactors in Figs. 3, 4 and 5 or they may be of the type shown in Fig. 1 or Fig. 2.

The withdrawal lines associated with the reaction vessels shown in Figs. 3, 4 and 5 as above stated may be supplied with fluidizing lines to maintain the withdrawn catalyst particles in a fluidized condition while passing through the withdrawal lines. The vertical lines associated with the withdrawal lines in Figs. 3, 4 and 5 may also be provided with fluidizing lines to maintain the catalyst particles in fluidized condition while they are being withdrawn from the respective reaction zones or vessels.

While I have shown several forms of apparatus adapted for using my invention and have given conditions of operation, it is to be understood that these are by way of illustration only and modifications or changes may be made without departing from the spirit of my invention.

What is claimed is:

1. In a method of treating hydrocarbons with a subdivided solid material, wherein a bed of said subdivided material is maintained as a fluidized, liquid-simulating dense phase in the lower portion of a reaction zone, superimposed by a dilute phase of hydrocarbon vapors containing only a small amount of entrained particles of the solid material, and the hydrocarbons to be treated are passed upwardly through said dense phase; and a bed of said subdivided material is maintained as a fluidized, liquid-simulating dense phase in the lower portion of a regeneration zone, superimposed by a dilute phase of gaseous material containing only a small amount of entrained particles of the solid material, and subdivided solid material is circulated from the dense phase in the reaction zone to the regeneration zone, and from the dense phase in the regeneration zone back to the reaction zone; the improvement in the method of removing volatile matter from said solid material following its passage through the reaction zone and prior to its passage through the regeneration zone which comprises withdrawing a stream of the subdivided solid material directly from the fluidized, dense phase in the regeneration zone, passing a portion of said stream of withdrawn regenerated solid material directly to said reaction zone, withdrawing a stream of subdivided solid material which contains volatile matter directly from the fluidized dense phase in the reaction zone, mixing said last-named stream of solid material with the rest of the stream of highly heated solid material which was withdrawn from the regeneration zone and passing the mixture suspended in a stripping gas upwardly in a stripping zone to remove volatile matter therefrom, the velocity of the stripping gas passing upwardly through said stripping zone being selected to maintain a bed of the particles of solid material undergoing stripping as a dense, fluidized, liquid-simulating phase in the lower portion of said stripping zone, and returning the stripped solid material from the lower portion of the stripping zone to said regeneration zone.

2. In a method of treating hydrocarbons with a subdivided solid material, wherein a bed of said subdivided material is maintained as a fluidized, liquid-simulating dense phase in the lower portion of a reaction zone, superimposed by a dilute phase of hydrocarbon vapors containing only a small amount of entrained particles of the solid material, and the hydrocarbons to be treated are passed upwardly through said dense phase, and a bed of said subdivided material is maintained as a fluidized, liquid-simulating dense phase in the lower portion of a regeneration zone, superimposed by a dilute phase of gaseous material containing only a small amount of entrained particles of the solid material, and subdivided solid material is circulated from the dense phase in the reaction zone to the regeneration zone, and from the dense phase in the regeneration zone back to the reaction zone; the improvement in the method of removing volatile matter from said solid material following its passage through the reaction zone and prior to its passage through the regeneration zone which comprises withdrawing a stream of the subdivided solid material directly from the fluidized, dense phase in the regeneration zone, passing a portion of said stream of withdrawn regenerated solid material directly to said reaction zone, withdrawing a stream of subdivided solid material which contains volatile matter directly from the fluidized dense phase in the reaction zone, mixing said last-named stream of solid material with the rest of the stream of highly heated solid material which was withdrawn from the regeneration zone and passing the mixture suspended in a stripping gas upwardly in a stripping zone to remove volatile matter therefrom, the velocity of the stripping gas passing upwardly through said stripping zone being selected to maintain a bed of the particles of solid material undergoing stripping as a dense, fluidized, liquid-simulating phase in the lower portion of said stripping zone superimposed by a dilute phase of stripping gas containing only a small amount of entrained solid particles, withdrawing stripping gas and volatile matter as a separate stream from the dilute phase in said stripping zone and returning the stripped solid material from the lower portion of the stripping zone to said regeneration zone.

3. In a method of treating hydrocarbons with a subdivided solid material, wherein a bed of said subdivided material is maintained as a fluidized, liquid-simulating dense phase in the lower portion of a reaction zone, superimposed by a dilute phase of hydrocarbon vapors containing only a small amount of entrained particles of the solid material, and the hydrocarbons to be treated are passed upwardly through said dense phase; and a bed of said subdivided material is maintained as a fluidized, liquid-simulating dense phase in the lower portion of a regeneration zone, superimposed by a dilute phase of gaseous material containing only a small amount of entrained particles of the solid material, and subdivided solid material is circulated from the dense phase in the reaction zone to the regeneration zone, and from the dense phase in the regeneration zone back to the reaction zone; the improvement in the method of removing volatile matter from said solid material following its passage through the reaction zone and prior to its passage through the regeneration zone which comprises withdrawing a stream of the subdivided solid material directly from the fluidized, dense phase in the regeneration zone, passing a portion of said stream of withdrawn regenerated solid material directly to said reaction zone, withdrawing a stream of subdivided solid material which contains volatile matter directly from the fluidized dense phase in the reaction zone, mixing said last-named stream of solid material with the rest of the stream of highly heated solid material which was withdrawn from the regeneration zone and passing the mixture suspended in a stripping gas into the lower portion of a stripping zone to remove volatile matter therefrom, the velocity of the stripping gas passing upwardly through said stripping zone being selected to maintain a bed of the particles of solid material undergoing stripping as a dense, fluidized, liquid-simulating phase in the lower portion of said stripping zone, and returning the stripped solid material from the lower portion of the stripping zone to said regeneration zone.

4. In a method of cracking hydrocarbons with a subdivided solid catalytic material, wherein a bed of said subdivided material is maintained as a fluidized, liquid-simulating dense phase in the lower portion of a cracking zone, superimposed by a dilute phase of hydrocarbon vapors containing only a small amount of entrained particles of the solid material, and the hydrocarbons to be cracked are passed upwardly through said dense phase; and a bed of said subdivided material is maintained as a fluidized, liquid-simulating dense phase in the lower portion of a regeneration zone, superimposed by a dilute phase of gaseous material containing only a small amount of entrained particles of the solid material, and subdivided solid material is circulated from the dense phase in the cracking zone to the regeneration zone, and from the dense phase in the regeneration zone back to the cracking zone; the improvement in the method of removing volatile matter from said solid material following its passage through the cracking zone and prior to its passage through the regeneration zone which comprises withdrawing a stream of the subdivided solid material directly from the fluidized, dense phase in the regeneration zone, passing a portion of said stream of withdrawn regenerated solid material directly to said cracking zone, withdrawing a stream of subdivided solid material which contains volatile matter directly from the fluidized dense phase in the cracking zone, mixing said last-named stream of solid material with the rest of the stream of highly heated solid material which was withdrawn from the regeneration zone and passing the mixture suspended in a stripping gas upwardly in the lower portion of a stripping zone to remove volatile matter therefrom, the velocity of the stripping gas passing upwardly through said stripping zone being selected to maintain a bed of the particles of solid material undergoing stripping as a dense, fluidized, liquid-simulating phase in the lower portion of said stripping zone, and returning the stripped solid material from the lower portion of the stripping zone to said regeneration zone.

5. In a method of treating hydrocarbons with a subdivided solid material, wherein a bed of said subdivided material is maintained as a fluidized, liquid-simulating dense phase in the lower portion of a reaction zone, superimposed by a dilute phase of hydrocarbon vapors containing only a small amount of entrained particles of the solid material, and the hydrocarbons to be treated are passed upwardly through said dense phase; and a bed of said subdivided material is maintained as a fluidized, liquid-simulating dense phase in the lower portion of a regeneration zone, superimposed by a dilute phase of gaseous material containing only a small amount of entrained particles of the solid material, and subdivided solid material is circulated from the dense phase in the reaction zone to the regeneration zone, and from the dense phase in the regeneration zone back to the reaction zone; the improvement in the method of removing volatile matter from said solid material following its passage through the reaction zone and prior to its passage through the regeneration zone which comprises withdrawing a stream of the subdivided solid material directly from the fluidized, dense phase in the regeneration zone, passing a portion of said stream of withdrawn regenerated solid material directly to said reaction zone, withdrawing a stream of subdivided solid material which contains volatile matter directly from the fluidized dense phase in the reaction zone, mixing said last-named stream of solid material with the rest of the stream of highly heated solid material which was withdrawn from the regeneration zone and passing the mixture suspended in a stripping gas upwardly in a stripping zone to remove volatile matter therefrom, the velocity of the stripping gas passing upwardly through said stripping zone being selected to maintain a bed of the particles of solid material undergoing stripping as a dense, fluidized, liquid-simulating phase in the lower portion of said stripping zone, withdrawing stripping gas and volatile matter as a separate stream from the upper portion of said stripping zone, and returning the stripped solid material from the lower portion of the stripping zone to said regeneration zone.

CHARLES E. HEMMINGER.

REFERENCES CITED

The following references are of record in the file of this patent:

UNITED STATES PATENTS

| Number | Name | Date |
|---|---|---|
| 2,157,775 | Smith | May 9, 1939 |
| 2,296,159 | Gordon | Sept. 15, 1942 |
| 2,311,564 | Munday | Feb. 16, 1943 |
| 2,326,705 | Thiele et al. | Aug. 10, 1943 |
| 2,344,449 | Ogorzaly | Mar. 14, 1944 |
| 2,356,697 | Rial | Aug. 22, 1944 |
| 2,357,901 | Lewis et al. | Sept. 12, 1944 |
| 2,367,694 | Snuggs | Jan. 23, 1945 |
| 2,369,523 | Belchetz | Feb. 13, 1945 |
| 2,378,542 | Edmister | June 19, 1945 |
| 2,389,236 | Payne | Nov. 20, 1945 |
| 2,394,814 | Snuggs | Feb. 12, 1946 |
| 2,398,228 | Hunt | Apr. 9, 1946 |
| 2,414,883 | Martin | Jan. 28, 1947 |
| 2,451,619 | Hengstebeck et al. | Oct. 19, 1948 |

FOREIGN PATENTS

| Number | Country | Date |
|---|---|---|
| 554,227 | Great Britain | June 25, 1943 |